(12) United States Patent
Fukui

(10) Patent No.: US 7,502,343 B2
(45) Date of Patent: Mar. 10, 2009

(54) COMMUNICATION TERMINAL, SYSTEM AND METHOD FOR CONNECTING A TERMINAL WITH UNKNOWN ID INFORMATION VIA A NETWORK

(75) Inventor: Kiyoshi Fukui, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 759 days.

(21) Appl. No.: 10/882,265

(22) Filed: Jul. 2, 2004

(65) Prior Publication Data
US 2005/0002404 A1 Jan. 6, 2005

(30) Foreign Application Priority Data
Jul. 3, 2003 (JP) ............................. 2003-191337

(51) Int. Cl.
H04Q 7/00 (2006.01)
H04Q 7/20 (2006.01)
H04L 12/28 (2006.01)
(52) U.S. Cl. ............... 370/328; 370/395.21; 370/395.3; 455/456.3
(58) Field of Classification Search ............. 370/395.3, 370/395.2, 400; 455/456.3
See application file for complete search history.

(56) References Cited

U.S. PATENT DOCUMENTS

| 6,522,888 | B1* | 2/2003 | Garceran et al. | 455/456.3 |
| 6,867,733 | B2* | 3/2005 | Sandhu et al. | 342/357.07 |
| 7,290,000 | B2 | 10/2007 | Meifu et al. | |
| 2003/0083079 | A1* | 5/2003 | Clark et al. | 455/466 |
| 2003/0195008 | A1* | 10/2003 | Mohi et al. | 455/456.5 |
| 2003/0199280 | A1* | 10/2003 | Shih | 455/456.1 |
| 2003/0225512 | A1* | 12/2003 | Kim et al. | 701/209 |
| 2004/0119986 | A1* | 6/2004 | Benke et al. | 356/614 |
| 2004/0203873 | A1* | 10/2004 | Gray | 455/456.1 |

(Continued)

FOREIGN PATENT DOCUMENTS

JP S62-135250 8/1987

(Continued)

OTHER PUBLICATIONS

Japanese Office Action issued on Jun. 17, 2008 in corresponding Japanese Application No. 2003-191337 with translation.

Primary Examiner—Hassan Kizou
Assistant Examiner—Brandon Renner
(74) Attorney, Agent, or Firm—Venable LLP; Michael A. Sartoru; Catherine M. Voorhees

(57) ABSTRACT

The present invention provides a communication terminal which can make connection to a communication terminal the position of which can be specified in an actual space but the ID information of which is not known through a network. The communication terminal includes an object designation section for acquiring the position information and the direction information of the communication terminal, an AP information acquisition section for acquiring the application information of an opponent communication terminal acting as a communication opponent, a memory section for storing the position information in the actual space of respective communication terminals, identification information for identifying the respective communication terminals in the network, and attribution information, a search section for searching the identification information of a communication terminal having the AP information in a region specified by the position information and the direction information of the communication terminal from the memory section.

10 Claims, 5 Drawing Sheets

U.S. PATENT DOCUMENTS

2004/0203915 A1* 10/2004 van Diggelen et al. ... 455/456.1
2004/0204831 A1* 10/2004 Pochuev et al. ............. 701/207
2004/0213409 A1* 10/2004 Murto et al. ................ 380/258

FOREIGN PATENT DOCUMENTS

| | | |
|---|---|---|
| JP | 07-264298 | 10/1995 |
| JP | 10-336319 | 12/1998 |
| JP | 2000-286950 | 10/2000 |
| JP | 2001-144767 | 5/2001 |
| JP | 2001-243251 | 9/2001 |
| JP | 2002-132806 | 5/2002 |
| JP | 2002-237893 | 8/2002 |

* cited by examiner

COMMUNICATION TERMINAL, SYSTEM AND METHOD FOR CONNECTING A TERMINAL WITH UNKNOWN ID INFORMATION VIA A NETWORK

CROSS REFERENCE TO RELATED APPLICATIONS

The disclosure of Japanese Patent Application No.JP2003-191337, filed Jul. 3, 2003, entitled "Communication Terminal, Communication System, and Communication Method." The contents of that application are incorporated herein by reference in their entirety.

BACKGROUND OF THE INVENTION

The present invention relates to a communication terminal, a communication system, and communication method that execute communication through a network. More particularly, the present invention relates to a function for specifying a communication terminal (opponent communication terminal) acting as a communication opponent without acquiring the position information thereof.

DESCRIPTION OF THE RELATED ART

At present, various communication networks such as the Internet, telephone networks and the like are installed everywhere, and communication terminals can transfer data therebetween through these communication networks (refer to, for example, Japanese Patent Laid-open Publication No. 2001-144767). In particular, data can be transferred through radio communication networks due to the development of mobile phones, wireless LAN, Bluetooth, and the like. Accordingly, it is possible to talk, to exchange mails, to stream images, and to transfer files though the communication networks.

To connect a self communication terminal to other communication terminal (opponent communication terminal), the self communication terminal must know ID information for identifying the opponent communication terminal in a network. For example, in the Internet, communication can be executed through the network by designating the IP address of a communication opponent. Further, a communication terminal can be connected to a particular server that presents an image service and can receive the image service by designating the network address and the port number of the server. Further, the user of a self communication terminal can print data by a printer located in front of him or her by designating the address of the printer and sending a file.

However, when the ID information of an opponent communication terminal is not known at the beginning of communication, communication cannot be executed because the opponent terminal cannot be identified in a network. To cope with this problem, the ID information must be previously acquired by a different means. That is, it is necessary to directly get the ID information from the owner of the opponent communication terminal or to search it making use of a search service. Further, even if an opponent communication terminal is located in front of the user of a self communication terminal, he or she cannot execute communication unless he or she knows the ID information of the terminal. Further, to make connection to the opponent communication terminal, he or she must identify the terminal in front of him or her by inputting the previously acquired ID information of the terminal to the self communication terminal, from which a problem arises in that the operation is very inconvenient. To solve the above problem, in Japanese Patent Laid-open Publication No. 2001-144767, an opponent communication terminal (terminal to be connected) receives information for specifying a communication terminal therefrom and starts communication when the terminal is a previously designated terminal. With this arrangement, the user of the terminal can easily start communication with the opponent communication terminal in front of him or her without being conscious of the ID information of a communication opponent.

However, to specify an opponent communication terminal by the method disclosed in the above document, the terminal must be provided with a mechanism for previously designating terminals with which it can make communicate and a mechanism for selecting a communication terminal at the beginning of communication. Accordingly, to apply the above method to communication terminals that have been installed, the terminals must be modified. Further, the method also has a problem in that it cannot specify any terminal other than the previously designated terminals.

SUMMARY OF THE INVENTION

An object of the present invention, which was made in view of the above problems of known communication systems, is to provide a novel and improved communication terminal, communication system, and communication method which can make connection a communication terminal the position of which can be specified in an actual space but the ID information of which is not known, through a network.

To solve the above problems, according to a first aspect of the present invention, there is provided a communication terminal which executes communication through a network and includes an object designation section for acquiring the position information and the direction information of the communication terminal, a memory section for storing the position information in an actual space of respective communication terminals and identification information for identifying the respective communication terminals in the network, and a search section for searching the identification information of an opponent communication terminal acting as a communication opponent in a region specified by the position information and the direction information of the communication terminal from the memory section.

According to the above arrangement, the position of the opponent communication terminal can be specified in the actual space by providing the object designation section for acquiring the position information and the direction information of the communication terminal itself and by indicating the opponent communication terminal acting as the communication opponent. Then, connection to the opponent communication terminal can be made through the network by searching the identification information (ID information) of the opponent communication terminal located in the specified region from a data base of the memory section. As described above, it is possible to make connection to a communication terminal the position of which can be specified in the actual space but the ID information of which is not known through the network.

Further, to solve the above problems, according to a second aspect of the present invention, there is provided a communication system which includes a communication terminal and an opponent communication terminal search server through which the communication terminal searches an opponent communication terminal acting as a communication opponent. The communication terminal includes an object designation section for acquiring the position information and the direction information thereof and a communication section for transmitting the position information and the direction information of the communication terminal to the opponent communication terminal search server.

The opponent communication terminal search server includes a communication section for receiving the position information and the direction information of the communication terminal therefrom, a memory section for storing the position information in an actual space of respective communication terminals and identification information for identifying the respective communication terminals in a network, and a search section for searching the identification information of the opponent communication terminal acting as the communication opponent in a region specified by the position information and the direction information of the communication terminal from the memory section.

According to the communication system arranged as described above, there can be obtained not only an effect substantially similar to that of the communication terminal of the present invention described above but also an effect that a function for searching the identification information of the opponent communication terminal acting the communication opponent and the position information and the direction information of the communication terminal need not be provided with respective communication terminals.

To solve the above problems, according to a third aspect of the present invention, there is provided a communication method of a communication terminal that executes communication through a network. The communication terminal includes a memory section for storing the position information in an actual space of respective communication terminals and identification information for identifying the respective communication terminals in the network.

The communication method includes an object designation step for acquiring the position information and the direction information of the communication terminal, and a search step for searching the identification information of an opponent communication terminal acting as a communication opponent in a region specified by the position information and the direction information of the communication terminal from the memory section.

According to the communication method arranged as described above, the position of the opponent communication terminal can be specified in the actual space by including the object designation step for acquiring the position information and the direction information of the communication terminal itself and by indicating the opponent communication terminal acting as the communication opponent. Then, connection to the opponent communication terminal can be made through the network by searching the identification information (ID information) of the opponent communication terminal located in the specified region from a data base of the memory section. Accordingly, it is possible to make connection to a communication terminal the position of which can be specified in the actual space but the ID information of which is not known through the network.

DETAILED DESCRIPTION OF THE PREFERRED EMBODIMENTS

Figure 1:
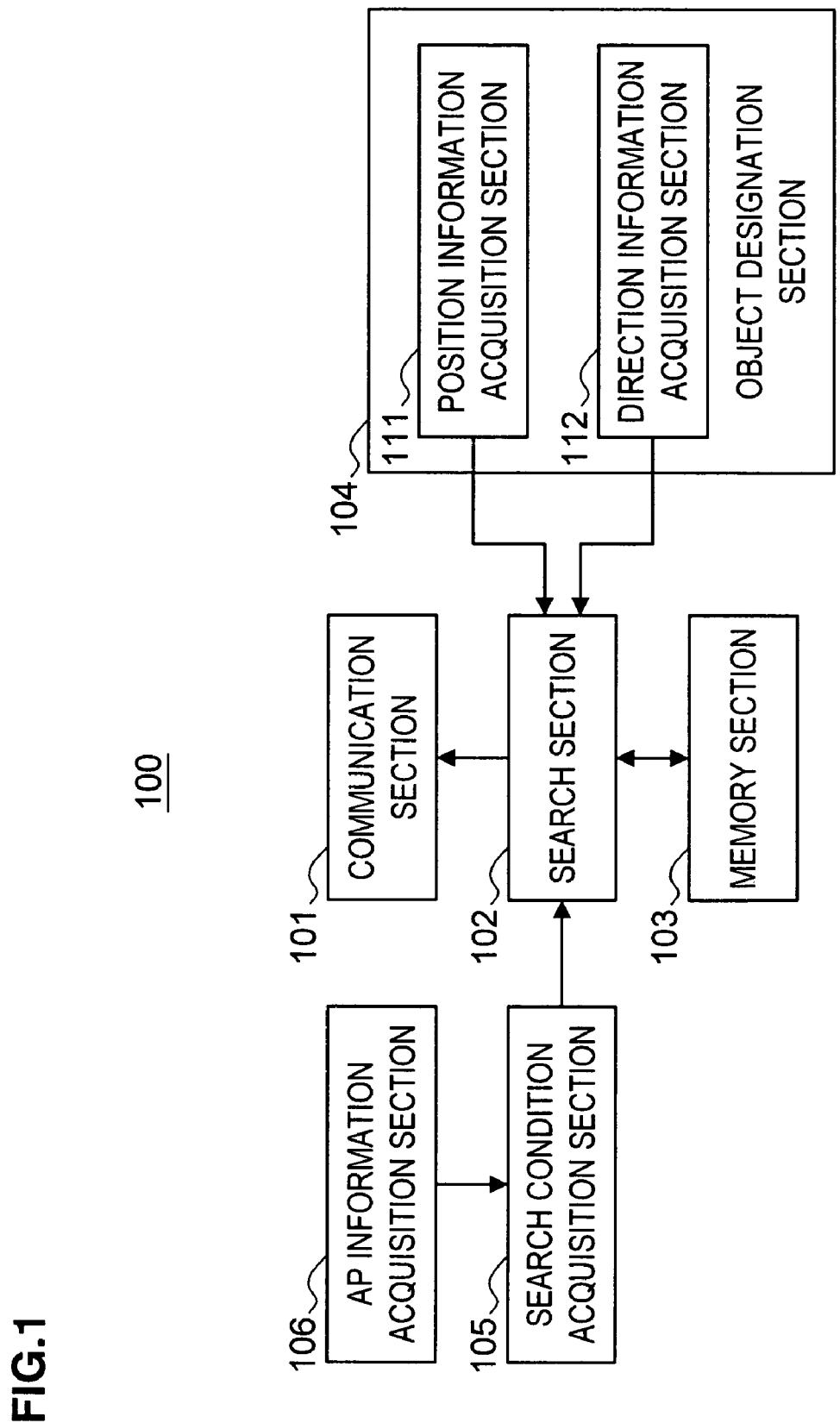
FIG. 1 is a block diagram showing a schematic arrangement of a communication terminal according to a first embodiment.

Preferable embodiments of a communication terminal, a communication system and a communication method according to the present invention will be explained below in detail with reference to the accompanying drawings. Note that, in the specification and the drawings, components that have substantially the same function and arrangement are denoted by the same reference numerals, and the duplicate explanation thereof is omitted.

First Embodiment

FIG. 1 is a block diagram showing a schematic arrangement of a communication terminal according to a first embodiment. The communication terminal 100 according to the embodiment will be explained below with reference to FIG. 1.

As shown in FIG. 1, the communication terminal 100 is composed of a communication section 101, a search section 102, a memory section 103, and an object designation section 104. Further, the communication terminal 100 is composed of a search condition acquisition section 105 and an AP information acquisition section 106 as arbitrary components.

The respective components of the communication terminal 100 will be explained below.

(Object Designation Section 104)

The object designation section 104 is a means for acquiring the position information and the direction information of the communication terminal 100 and composed of a position information acquisition section 111 and a direction information acquisition section 112. With this arrangement, the object designation section 104 has a function for designating a region of the communication terminal 100 in an actual space.

The position information acquisition section 111 has a function for acquiring the position information of the object designation section 104 and notifying the search section 102 of the acquired information. The position information may be acquired by a direct input executed by a user or may be measured by a position information measurement means such as GPS (Global Positioning System), and the like. The direction information acquisition section 112 has a function for acquiring the direction information of the object designation section 104 and notifying the search section 102 of the acquired information. The direction information may be acquired by a direct input executed by the user or may be measured by a direction information measurement means such as a gyrocompass and the like.

(AP Information Acquisition Section 106)

The AP information acquisition section 106 is an example of a means for acquiring the attribution information of an opponent communication terminal acting as a communication opponent. In the embodiment, information (hereinafter, referred to as "AP information") as to an application (AP), which makes use of a communication function provided with the opponent communication terminal, is handled as an example of the attribution information. The AP information acquisition section 106 has a function for acquiring the AP information of the opponent communication terminal and notifying the search condition acquisition section 105 of the attribution information, which indicates that an application that can execute communication with the acquired application is provided as a search condition.

(Search Condition Acquisition Section 105)

The search condition acquisition section 105 has a function for acquiring a search condition when an opponent communication terminal designated by the object designation section 104 is searched and notifying the search section 102 of the search condition. For example, it can be used as the search condition that the attribution information notified from the AP information acquisition section 106 is provided.

It should be noted that although the embodiment is explained on the assumption that it handles the information as to the application for making use of the communication function provided with the opponent communication terminal as an example of the attribution information and that the search condition corresponds to the information, the present invention is by no means limited thereto. For example, a shape, size, color, and the like of the opponent communication terminal designated by the object designation section 104 may be given to the search condition acquisition section 105 as the attribution information and may be used as the search condition.

Further, an approximate distance to the opponent communication terminal designated by the object designation section 104 may be given to the search condition acquisition section 105 as the search condition. That is, the search condition acquisition section 105 may be caused to act as a distance information acquisition section for acquiring distance information from the communication terminal 100 to the opponent communication terminal. In this case, a region, in which the opponent communication terminal is searched by the search section 102, may be limited to the distance specified by the distance information.

The above information may be directly input by the user through an input means provided with the search condition acquisition section 105. Otherwise, the information may be acquired by disposing a camera to the object designation section 104 and acquiring an outside appearance of the designated opponent communication terminal by the camera or may be automatically acquired from a distance sensor disposed to the object designation section 104.

(Memory Section 103)

The memory section 103 stores the position information of respective communication terminals in the actual space and the ID information of the communication terminals for identifying them in a network. In the embodiment, the communication terminal 100 has the AP information acquisition section 106 as an example of an attribution information acquisition section, and the AP information acquisition section 106 acquires the attribution information of the opponent communication terminal. In correspondence to the attribution information, the memory section 103 further stores attribution information that indicates the characteristics of the respective communication terminals.

(Search Section 102)

The search section 102 is a means for searching the ID information of a communication terminal, which satisfies the search condition notified from the search condition acquisition section 105, from the memory section 103 in a region, which is specified by the position information and the direction information of the communication terminal 100 notified from the object designation section 104. The search section 102 has a function for determining the opponent communication terminal as described above and acquiring the ID information of the determined opponent communication terminal. The communication section 101 is notified of the acquired ID information.

(Communication Section 101)

The communication section 101 has a function for making connection to the opponent communication terminal searched by the search section 102 through the network.

The arrangement of the communication terminal 100 according to the first embodiment has been explained as described above.

Next, an operation of the communication terminal 100 will be explained with reference to FIG. 2.

The embodiment is characterized in an operation of the communication terminal 100 for connecting it to a communication terminal which can be indicated by the communication terminal 100 in the actual space, through a network. In the following explanation, an operation of a communication system 10 for connecting the communication terminal 100 to an opponent communication terminal 500, which can be indicated by the communication terminal 100 in the actual space, through a network 600 will be explained. It is assumed here that the communication terminal 100 does not have ID information for identifying the opponent communication terminal on the network at the beginning of connection to the opponent communication terminal. Further, the opponent communication terminal may have an arrangement similar to that of the communication terminal 100 or may be an ordinary communication terminal.

Figure 2:
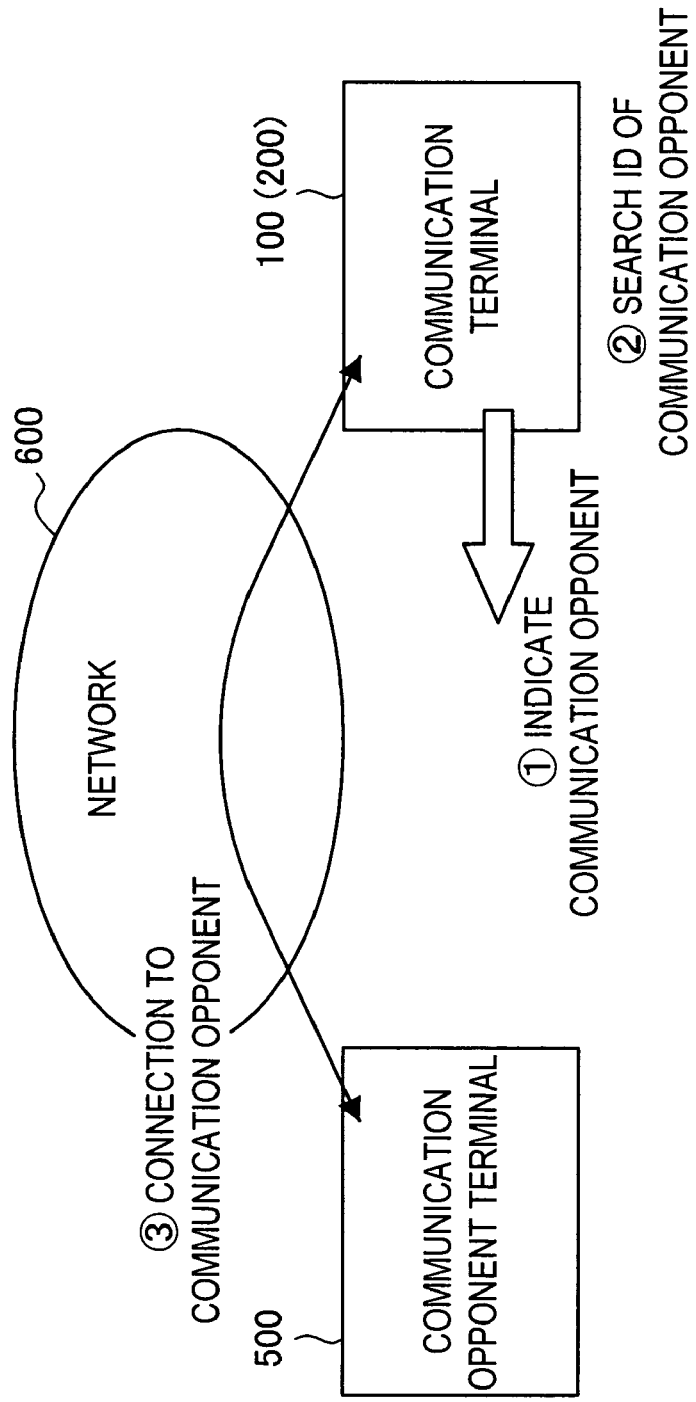
FIG. 2 is a view explaining a state in which a communication terminal executes communication with an opponent communication terminal as a communication opponent through a network.

FIG. 2 is a view explaining the communication system 10 for connecting the communication terminal 100 to the opponent communication terminal 500 acting as a communication opponent through the network 600.

As shown in FIG. 2, the communication terminal 100 of the embodiment is characterized in that (1) the opponent communication terminal 500 is specified by indicating it in the actual space, that (2) ID information for identifying the opponent communication terminal 500 on the network is acquired by the database provided with the self communication terminal, and that (3) processing for making connection to the opponent communication terminal 500 is executed through the network 600. These steps will be sequentially explained.

(1) To indicate the communication opponent:

First, the object designation section 104 of the communication terminal 100 is directed in a direction in which the opponent communication terminal 500 whose connection is desired (hereinafter, referred to as "connection-desired communication terminal") is located. That is, the connection-desired communication terminal is indicated by the object designation section 104. The object designation section 104 is arranged such that a direction indicated thereby can be found. For example, an arrow showing a direction indicated by the object designation section 104 may be printed on a surface thereof, or it is made possible for a user to physically recognize an indicated direction by forming the object designation section 104 in a bar shape. Otherwise, a direction, in which a communication terminal with which the user desires to be connected, is located, may be directly input by the user through an input means provided with the object designation section 104. With the above operation, it is indicated to start a connecting operation in a state that the object designation section 104 indicates the connection-desired communication terminal.

(2) To search the ID information of the communication opponent:

When it is indicated to start the connecting operation, the position information acquisition section 111 and the direction information acquisition section 112 provided with the object designation section 104 acquire the position information and the direction information of the communication terminal 100, respectively and notify the search section 102 of the acquired information. In parallel with the above operation, the AP information acquisition section 106 acquires the information of an application which is in operation in the communication terminal 100 and notifies the search condition acquisition section 105 of the acquired application and attribution information, which indicates that an application capable of executing communication is provided as a search condition. The search condition acquisition section 105 acquires a search condition that is used when the opponent communication terminal 500, which is indicated by the object designation section 104, is searched and notifies the search section 102 of the search condition. For example, it can be used as the search condition that the attribution notified from the AP information acquisition section 106 is provided. As a specific example, when an application for executing a voice call is in operation in the communication terminal 100, it may be used as a condition that the opponent communication terminal to be connected has a voice call function. In addition to the above, the shape, size, and color of the opponent communication terminal indicated by the object designation section 104, the distance to the communication terminal, and the like may be used as the search condition.

The search section 102 first determines a region in the actual space which is contemplated to be indicated by the object designation section 104 from the information notified from the position information acquisition section 111 and the direction information acquisition section 112 and uses the region as a search region. For example, a columnar or conical region, which starts from the position indicated by the notified position information and is directed in the direction indicated by the notified direction information, can be used as the search region.

Further, when a condition for restricting the search region is included in the search condition notified from the search condition acquisition section 105, the search condition is restricted according to the above condition. When, for example, the approximate distance to the communication terminal indicated by the object designation section 104 is designated as the search condition, a region, which is obtained by cutting out the vicinity of the designated distance from the columnar or conical region described above can be used as the search region. Next, a communication terminal, which is located within the determined search region and has an attribution designated by the search condition notified from the search condition acquisition section 105, is searched from the memory section 103, ID information for recognizing the communication opponent on the network is acquired, the communication section 101 is notified of the ID information.

(3) Connection to the communication opponent:

The communication section 101 executes processing for making connection to the communication terminal having the notified ID information through the network.

(Effect of first embodiment)

As described above, according to the first embodiment, it is possible to make connection to the communication opponent terminal 500 the position of which can be specified in the actual space but the ID information of which is not known, through the network 600 by specifying the position of a connection-desired communication terminal by indicating it in the actual space and searching the ID information of the communication terminal located in the specified region from the data base. Further, when the ID information is searched from the data base, erroneous search of the ID information can be suppressed by applying the attribution information of the connection-desired communication terminal, the distance to the communication terminal, and the like as the search condition.

Second Embodiment

Figure 3:
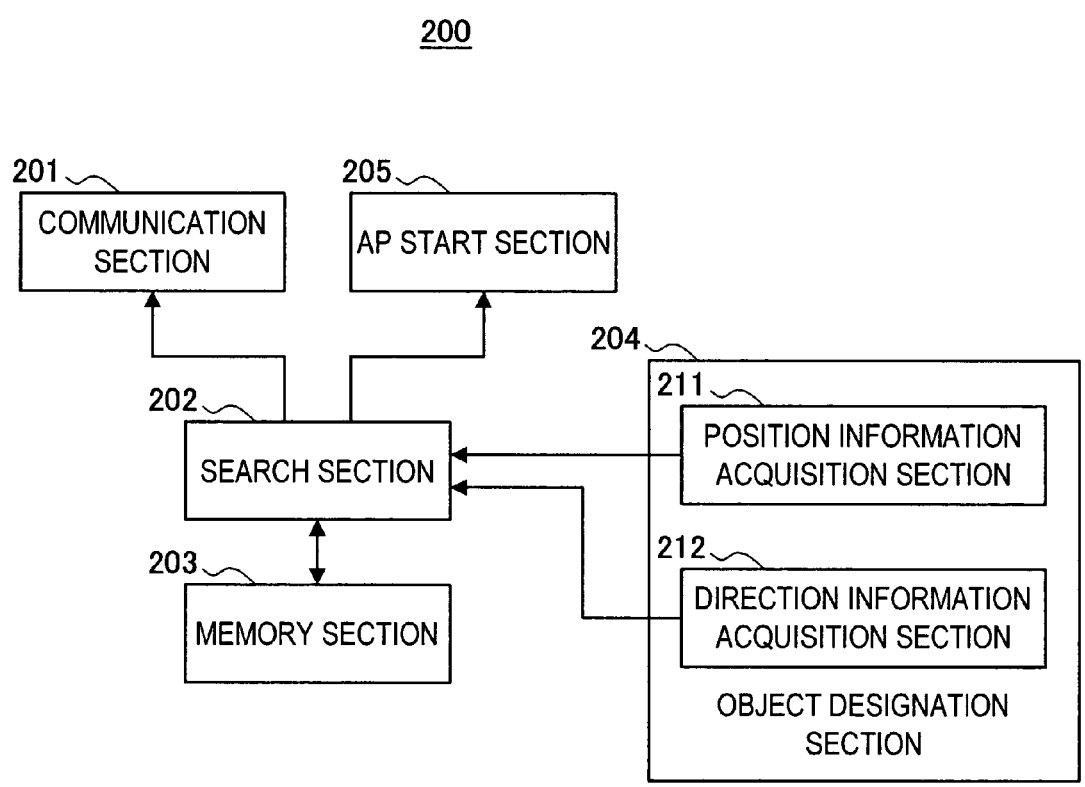
FIG. 3 is a block diagram showing a schematic arrangement of a communication terminal according to a second embodiment.

FIG. 3 is a block diagram showing a schematic arrangement of a communication terminal according to a second embodiment. The communication terminal 200 according to the second embodiment will be explained below with reference to FIG. 3.

As shown in FIG. 3, the communication terminal 200 is composed of a communication section 201, a search section 202, a memory section 203, an object designation section 204, and an AP start section 205. The object designation section 204 is composed of a position information acquisition section 211 and a direction information acquisition section 212. Although the second embodiment does not include the search condition acquisition section 105 and the AP information acquisition section 106 in the first embodiment as its components, the embodiment may be arranged so as to include them.

The respective components of the communication terminal 200 will be explained below. However, since the communication section 201, the memory section 203, the object designation section 204, the position information acquisition section 211, and the direction information acquisition section 212 are substantially the same as the communication section 101, the memory section 103, the object designation section 104, the position information acquisition section 111, and the direction information acquisition section 112 of the first embodiment, a duplicate explanation thereof is omitted.

(Search Section 202)

The search section 202 is a means for searching the ID information and the attribution information of a communication terminal from the memory section 103 in a region, which is specified by the position information and the direction information of the communication terminal 200 notified from the object designation section 104. In the second embodiment, information (hereinafter, referred to as AP information) as to an application (AP), which makes use of a communication function, is handled as an example of the attribution information. The search section 102 has a function for determining an opponent communication terminal as described above and acquiring the ID information and the attribution information of the determined opponent communication terminal. The communication section 101 is notified of the acquired ID information. Further, the AP start section 205 is notified of the acquired attribution information.

(AP Start Section 205)

The AP start section 205 is a means for starting an appropriate application in accordance with the attribution information of the communication opponent notified from the search section 202. When, for example, it is found from the attribution information that the opponent communication terminal is a TV phone terminal, an application having a TV phone function is started. Note that the AP start section 205 may be act as a means for indicating other means, which starts applications, to start an appropriate application.

The arrangement of the communication terminal 200 according to the second embodiment has been explained as described above.

Next, an operation of the communication terminal 200 will be explained with reference to FIG. 2.

The communication terminal 200 of the second embodiment is different from the communication terminal 100 of the first embodiment in that a search condition is not designated when an opponent communication terminal is searched and that an appropriate application is started according to the attribution information of a searched opponent communication terminal. In the following explanation, an operation of a communication system 20 for connecting the communication terminal 200 to an opponent communication terminal 500, which can be indicated by the communication terminal 200 in an actual space, through a network 600 will be explained. It is assumed here that the communication terminal 200 does not have ID information for identifying the opponent communication terminal 500 on the network 600 at the beginning of connection to the opponent communication terminal 500. Further, the opponent communication terminal 500 may have an arrangement similar to that of the communication terminal 200 or may be an ordinary communication terminal. Operations different from those of the first embodiment will be mainly explained below.

(1) To indicate the communication opponent:

First, the object designation section 204 of the communication terminal 200 is directed in a direction in which the opponent communication terminal 500 whose connection is desired is located. With this operation, it is indicated to start a connecting operation in a state that the object designation section 104 indicates the connection-desired communication terminal.

(2) To search the ID information of the communication opponent:

When it is indicated to start the connecting operation, the position information acquisition section 211 and the direction information acquisition section 212 provided with the object designation section 204 acquire the position information and the direction information of the communication terminal 200, respectively and notify the search section 202 of the acquired information.

The search section 202 first determines a region in an actual space which is contemplated to be indicated by the object designation section 204 from the information notified from the position information acquisition section 211 and the direction information acquisition section 212 and uses the region as a search region. For example, a columnar or conical region, which starts from the position indicated by the notified position information and is directed in the direction indicated by the notified direction information, can be used as the search region. Next, a communication terminal located in the determined search region is searched from the memory section 203, ID information and attribution information by which the communication opponent is identified on the network is acquired, the communication section 201 is notified of the ID information, and the AP start section 205 is notified of the attribution information.

(3) Connection to the communication opponent:

The AP start section 205 starts an appropriate application in accordance with the attribution information of the communication opponent notified from the search section 202. The communication section 201 executes processing for making connection to the communication terminal having the notified ID information through the network 600.

(Effect of Second Embodiment)

As described above, according to the second embodiment, it is possible to make connection to the communication opponent terminal 500 the position of which can be specified in the actual space but the ID information of which is not known, through the network 600 by specifying the position of a connection-desired communication terminal by indicating it in the actual space and searching the ID information of the communication terminal located in the specified region from the data base. Further, since an appropriate application can be automatically started in accordance with the attribution information of the opponent communication terminal 500 to be connected, a manipulation executed by a user can be simplified.

Third Embodiment

Figure 4:
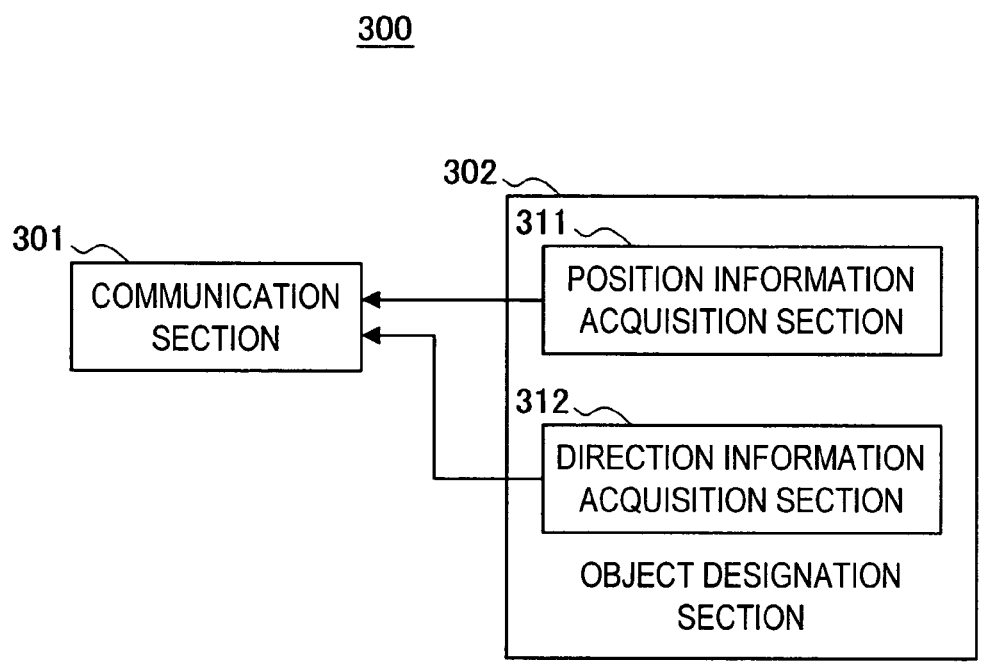
FIG. 4 is a block diagram showing a schematic arrangement of a communication terminal according to a third embodiment.
Figure 5:
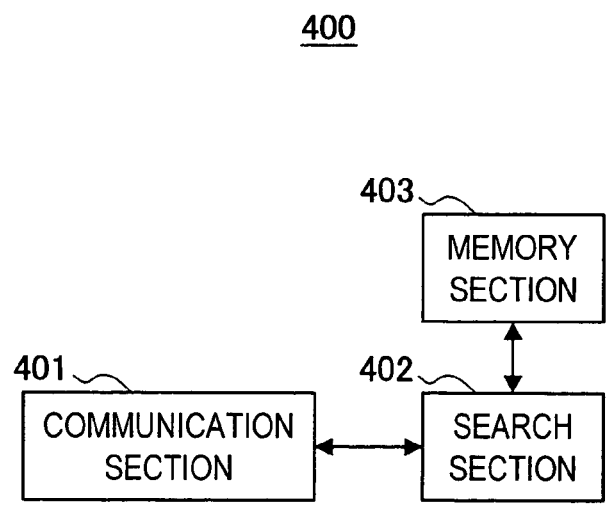
FIG. 5 is a block diagram showing a schematic arrangement of an opponent communication terminal search server according to the third embodiment.

In the third embodiment, a communication system, in which a communication terminal executes communication through a network will be explained. FIG. 4 is a block diagram showing a schematic arrangement of the communication terminal according to the third embodiment. FIG. 5 is a block diagram showing a schematic arrangement of an opponent communication terminal search server according to the third embodiment. The communication terminal 300 and the opponent communication terminal search server 400 according to the third embodiment will be explained below with reference to FIGS. 4 and 5.

(Communication Terminal 300)

As shown in FIG. 4, the communication terminal 300 is composed of a communication section 301 and an object designation section 302. The object designation section 302 is composed of a position information acquisition section 311 and a direction information acquisition section 312. Although the third embodiment does not include the search condition acquisition section 105 and the AP information acquisition section 106 in the first embodiment as its components, the third embodiment may be arranged so as to include them. Further, the third embodiment may be arranged so as to include the AP start section 205 in the second embodiment.

The respective components of the communication terminal 300 will be explained below. However, since the object designation section 302, the position information acquisition section 311, and the direction information acquisition section 312 are substantially the same as the object designation section 104, the position information acquisition section 111, and the direction information acquisition section 112 of the first embodiment, a duplicate explanation thereof is omitted.

(Communication Section 301)

The communication section 301 has a function for transmitting the position information and the direction information of the communication terminal 300 to the opponent communication terminal search server 400. The communication section 301 has a function for requesting to search an opponent communication terminal designated by the position information and the direction information notified from the position information acquisition section 311 and the direction information acquisition section 312 of the object designation section 302 and receiving ID information for identifying the opponent communication terminal on a network as a result of search after it is connected to the opponent communication terminal search server 400 through the network and a function for making connection to the opponent communication terminal having the ID information received as the result of search through the network.

(Communication Opponent Terminal Search Server 400)

As shown in FIG. 5, the opponent communication terminal search server 400, which is another component of the third embodiment, is composed of a communication section 401, a search section 402, and a memory section 403. The respective components of the opponent communication terminal search server 400 will be explained below.

(Communication Section 401)

The communication section 401 has a function for receiving the position information and the direction information of the communication terminal 300 therefrom. Then, the communication section 401 has a function for receiving a request for searching the opponent communication terminal designated by the position information and the distance information of the communication terminal 300 and returning the ID information for identifying the opponent communication terminal on the network as the result of search. The search section 402 is notified of the position information and the distance information received from the communication terminal 300.

(Memory Section 403)

The memory section 403 stores the position information in an actual space of respective communication terminals and the ID information of the communication terminals to identify them in the network.

(Search Section 402)

The search section 402 is a means for searching the ID information of a communication terminal located in a region, which is specified by the position information and the direction information of the communication terminal 300 notified from the communication section 401, from the memory section 403. The search section 402 has a function for determining the opponent communication terminal as described above and acquiring the ID information of the determined opponent communication terminal. The communication section 401 is notified of the acquired ID information.

The arrangements of the communication terminal 300 and the opponent communication terminal search server 400 according to the third embodiment have been explained as described above.

Figure 6:
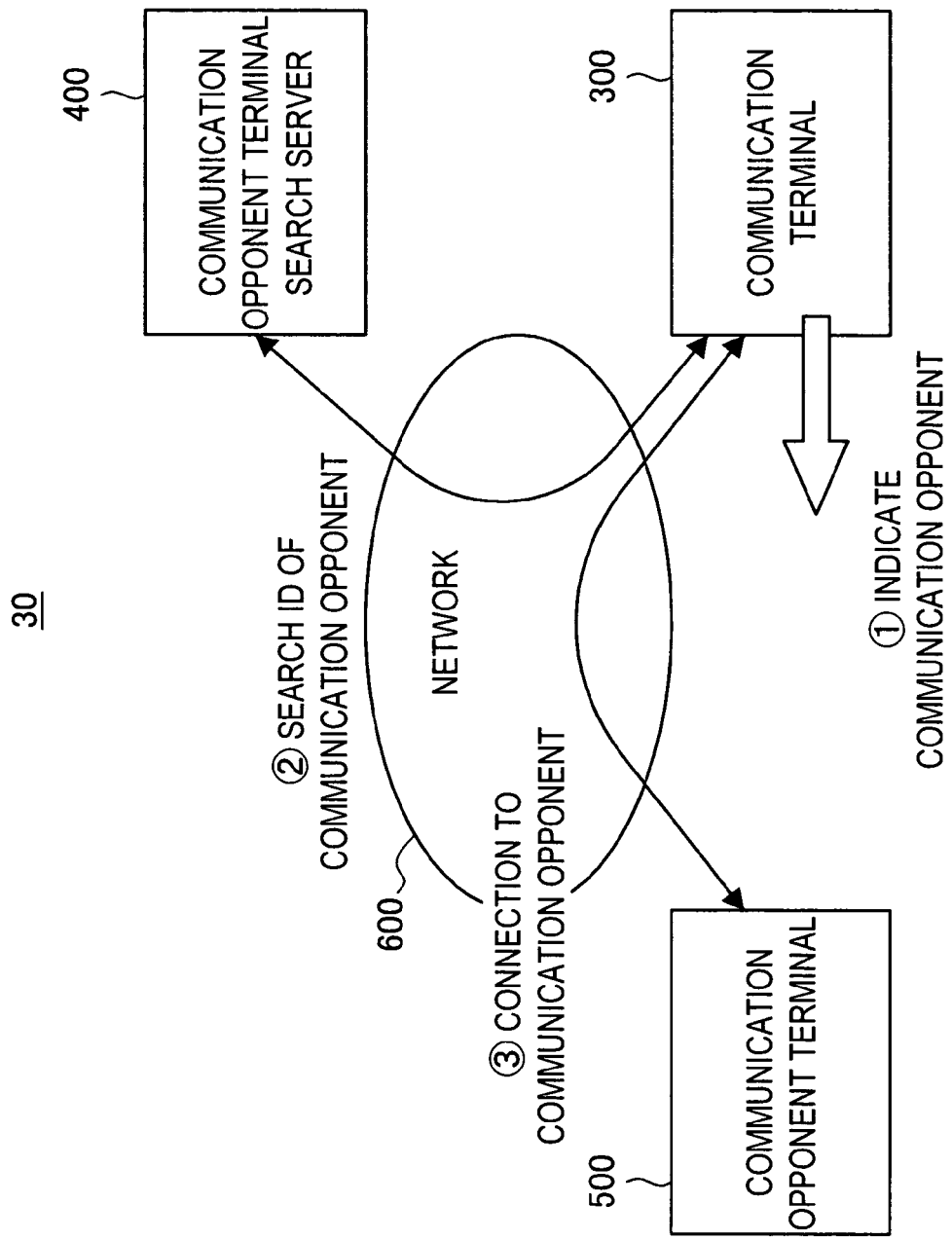
FIG. 6 is a view explaining a state in which a communication terminal executes communication with an opponent communication terminal search server and an opponent communication terminal acting as a communication opponent through a network.

Next, an operation of the communication system 30 according to the third embodiment will be explained with reference to FIG. 6.

The communication terminal 300 of the third embodiment is characterized in that it specifies an opponent communication terminal by indicating it in the actual space, acquires ID information for identifying the opponent communication terminal on the network by a data base provided with the opponent communication terminal search server 400 connected through the network, and then executes processing for making connection to the opponent communication terminal through the network. In the following explanation, an operation of the communication system 30 for making connection to an opponent communication terminal 500, which can be indicated by the communication terminal 300 in the actual space through a network 600, will be explained. It is assumed here that the communication terminal 300 does not have ID information for identifying the opponent communication terminal 500 on the network 600 at the beginning of connection to the opponent communication terminal 500. Further, the opponent communication terminal 500 may have an arrangement similar to that of the communication terminal 300 or may be an ordinary communication terminal. Operations different from those of the first embodiment will be mainly explained below.

(1) To indicate the communication opponent:

First, the object designation section 302 of the communication terminal 300 is directed in a direction in which the opponent communication terminal 500 whose connection is desired is located. With this operation, it is indicated to start a connecting operation in a state that the object designation section 302 indicates the connection-desired communication terminal.

(2) To search the ID information of the communication opponent:

When it is indicated to start the connecting operation, the position information acquisition section 311 and the direction information acquisition section 312 provided with the object designation section 302 acquire the position information and the direction information of the communication terminal 300, respectively and notify the communication section 301 of the acquired information.

The communication section 301 is connected to the opponent communication terminal search server 400 through the network 600 and transmits a request for searching the opponent communication terminal together with the position information and the direction information of the communication terminal 300. The opponent communication terminal search server 400 receives the position information and the direction information of the communication terminal 300 together with the request for searching the opponent communication terminal by the communication section 401 and notifies the search section 402 of the position information and the direction information.

The search section 402 determines the opponent communication terminal 500 by searching the communication terminals, which is located in a region designated by the position information and the direction information of the communication terminal 300 notified from the communication section 401, from the memory section 403 and acquires the ID information of the determined opponent communication terminal 500. The acquired ID information is returned to the communication terminal 300 which requested to search the opponent communication terminal through the communication section 401.

(3) Connection to the communication opponent:

When the communication terminal 300, which requested to search the opponent communication terminal 500, receives the ID information that is returned from the communication section 301, it executes processing for making connection to the communication terminal having the received ID information through the network 600.

(Effect of Third Embodiment)

As described above, according to the third embodiment, it is possible to make connection to the communication opponent communication terminal the position of which can be specified in the actual space but the ID information of which is not known, through the network by specifying the position of a connection-desired communication terminal by indicating it in the actual space and searching the ID information of the communication terminal located in the specified region from the data base. Further, it is not necessary to provide a search function and the data base with the respective communication terminals by providing the opponent communication terminal search server, which is connected through the network, with the data base that stores the ID information of the communication terminals and a means for searching the data base and by searching the opponent communication terminal 500 by the opponent communication terminal search server 400 through the network 600.

Although the communication terminal, the communication system and the communication method according to the present invention have been explained above as to the preferable embodiments with reference to the accompanying drawings, the present invention is by no means limited thereto. It is apparent that a person skilled in the art can easily conceive various modified examples and corrected examples within the scope of the technical idea disclosed in the claims, and these examples are regarded as naturally falling within the technical range of the present invention.

As described above, according to the present invention, the position of an opponent communication terminal acting as a communication opponent can be specified in the actual space by providing the object indication section for acquiring the position information and the direction information of the communication terminal itself and indicating the opponent communication terminal. Further, since the attribution information acquisition section for acquiring attribution information is provided, when the identification information (ID information) of the opponent communication terminal located in a specified region is searched from the data base of the memory section, a search range of the terminal can be limited. As described above, it is possible to make connection to a communication terminal the position of which can be specified in the actual space but the ID information of which is not known, through a network.

What is claimed is:

1. A communication terminal for executing communication through a network, comprising:
   an object designation section for acquiring the position information and the direction information of the communication terminal;
   a memory section for storing the position information and the direction information in an actual space of respective communication terminals and for storing identification information which identifies the respective communication terminals in the network;
   a search section for searching the identification information of an opponent communication terminal acting as a communication opponent in a region specified by the position information and the direction information of the communication terminal from the memory section;
   an attribution information acquisition section for acquiring attribution information of the opponent communication terminal acting as the communication opponent, wherein
   the memory section stores the position information and the direction information in the actual space of respective communication terminals, the identification information for identifying the respective communication terminals in the network, and the attribution information;
   the search section searches the identification information of a communication terminal having the attribution information in the region specified by the position information and the direction information of the communication terminal from the memory section; and
   the attribution information includes information as to applications that are provided with the opponent communication terminal and make use of a communication function; and
   an application start section for starting an appropriate application according to the attribution information of the opponent communication terminal searched by the search section.

2. A communication terminal according to claim 1, further comprising a distance information acquisition section for acquiring distance information from the communication terminal to the opponent communication terminal, and the region in which the opponent communication terminal is searched by the search section is limited to a distance specified by the distance information.

3. A communication system comprising a communication terminal and an opponent communication terminal search server through which the communication terminal searches an opponent communication terminal acting as a communication opponent, the communication terminal comprises:
   an object designation section for acquiring the position information and the direction information of the communication terminal; and
   a communication section for transmitting the position information and the direction information of the communication terminal to the opponent communication terminal search server, which comprises:
      a communication section for receiving the position information and the direction information of the communication terminal therefrom;
      a memory section for storing the position information and the direction information in an actual space of respective communication terminals and for storing identification information which identifies the respective communication terminals in a network; and
      a search section for searching the identification information of the opponent communication terminal acting as the communication opponent in a region specified by the position information and the direction information of the communication terminal from the memory section;
   wherein the communication system comprises an attribution information acquisition section for acquiring the attribution information of the opponent communication terminal acting as the communication opponent wherein the attribution information includes information as to applications that are provided with the opponent communication terminal and make use of a communication function; and
   wherein the communication terminal further comprises an application start section for starting an appropriate application according to the attribution information of the opponent communication terminal searched by the search section.

4. A communication system according to claim 3, wherein the communication section of the communication terminal transmits the position information and the direction information thereof and the attribution information to the opponent communication terminal server section;
   the communication section of the opponent communication terminal server section receives the position information and the direction information of the communication terminal and the attribution information from the communication terminal;
   the memory section of the opponent communication terminal server section stores the position information in the actual space of the respective communication terminals, the identification information for identifying the respective communication terminals in the network, and the attribution information; and the search section of the opponent communication terminal server section searches the identification information of a communication terminal having the attribution information in a region specified by the position information and the direction information of the communication terminal from the memory section.

5. A communication system according to claim 4, wherein the communication terminal further comprises a distance information acquisition section for acquiring distance information from the communication terminal to the opponent communication terminal, and the region in which the opponent communication terminal is searched by the search section is limited to a distance specified by the distance information.

6. A communication system according to claim 3, wherein the communication terminal further comprises a distance information acquisition section for acquiring distance information from the communication terminal to the opponent communication terminal, and the region in which the opponent communication terminal is searched by the search section is limited to a distance specified by the distance information.

7. A communication method of a communication terminal, which executes communication through a network and comprises a memory section for storing the position information and the direction information in an actual space of respective communication terminals and identification information for identifying the respective communication terminals in the network, the communication method comprising:

an object designation step for acquiring the position information and the direction information of the communication terminal;

a search step for searching the identification information of an opponent communication terminal acting as a communication opponent in a region specified by the position information and the direction information of the communication terminal from the memory section; and an application start step for starting an appropriate application according to attribution information of the opponent communication terminal searched at the search step, wherein the memory section of the communication terminal stores the position information and the direction information in the actual space of the respective communication terminals, the identification information for identifying the respective communication terminals in the network, and attribution information of the opponent communication terminal acting as the communication opponent, and the communication method further comprises an attribution information acquisition step for acquiring the attribution information of the opponent communication terminal, and the identification information of a communication terminal having the attribution information is searched in the region specified by the position information and the direction information of the communication terminal from the memory section at the search step.

8. A communication method according to claim 7, wherein the attribution information includes information as to applications that are provided with the opponent communication terminal and make use of a communication function.

9. A communication method according to claim 7, further comprising a distance information acquisition step for acquiring distance information from the communication terminal to the opponent communication terminal, and the region in which the opponent communication terminal is searched at the search step is limited to a distance specified by the distance information.

10. A communication method according to claim 7, further comprising a distance information acquisition step for acquiring distance information from the communication terminal to the opponent communication terminal, and the region in which the opponent communication terminal is searched at the search step is limited to a distance specified by the distance information.

* * * * *